United States Patent [19]

Nichols et al.

[11] Patent Number: 5,217,659
[45] Date of Patent: Jun. 8, 1993

[54] REPAIR OF FILTRATION ELEMENTS FOR POLYMER MANUFACTURE

[75] Inventors: Carl S. Nichols, Charlotte, N.C.; John V. Edwards, Rock Hill, S.C.

[73] Assignee: Wellman, Inc., Johnsonville, S.C.

[21] Appl. No.: 808,663

[22] Filed: Dec. 17, 1991

[51] Int. Cl.⁵ .................... B23D 6/00; B32B 35/00
[52] U.S. Cl. .................. 264/36; 29/402.18; 156/94; 210/232; 210/323.2; 210/485; 210/504; 210/508; 210/510.1; 264/35
[58] Field of Search ........... 264/35, 36; 29/402.18; 156/94; 210/504, 508, 510.1, 232, 483, 485, 323.2

[56] References Cited

U.S. PATENT DOCUMENTS

| | | | |
|---|---|---|---|
| 2,792,441 | 5/1957 | Platow | 264/261 X |
| 3,061,917 | 11/1962 | Pall | 29/402.18 |
| 3,499,062 | 3/1970 | Geary, Jr. et al. | 264/36 |
| 3,729,279 | 4/1973 | Mott . | |
| 3,968,192 | 7/1976 | Hoffman, III et al. | 156/94 X |
| 4,126,560 | 11/1978 | Marcus et al. . | |
| 4,138,303 | 2/1979 | Taylor, Sr. . | |
| 4,169,059 | 9/1979 | Storms . | |
| 4,170,695 | 10/1979 | Brown et al. | 264/36 X |
| 4,226,921 | 10/1980 | Tsang | 264/36 X |
| 4,248,648 | 2/1981 | Kopp | 264/36 X |
| 4,260,350 | 4/1981 | Russell, Jr. . | |
| 4,323,453 | 4/1982 | Zampini | 264/263 X |
| 4,323,454 | 4/1982 | Fritsche et al. | 264/261 X |
| 4,361,489 | 11/1982 | Kilsdonk et al. . | |
| 4,562,022 | 12/1985 | Li et al. . | |
| 4,597,727 | 7/1986 | Birkhauser, III . | |
| 4,689,191 | 8/1987 | Beck et al. | 264/263 X |

OTHER PUBLICATIONS

Ciba-Geigy Corp. 1985, Plastice Department, Product Data; Attachment 2; "Matrimid TM 5292 System".

Primary Examiner—Karen Aftergut
Attorney, Agent, or Firm—Bell, Seltzer, Park & Gibson

[57] ABSTRACT

A repair method for filter elements such as those used to filter polyester during the later stages of polyester manufacture in which the filter media is a particulate solid media arranged in a desired shape and maintained in that shape by a surrounding porous container that has filtration openings of a desired size. The method fills undesirably large openings in the surrounding porous container that result from damage to the container and through which enlarged openings the particulate solid media would otherwise escape with a polymeric resin. The polymeric resin is a resin with a glass transition temperature when cured that is at least greater than the melting point of polyester, and that has an absence of any chemical functional groups at temperatures at least as great as the melting point of polyester that would substantially react with polyester, the glycol precursors of polyester, the acid precursors of polyester, or the solvents useful in cleaning polyester from such filter elements.

16 Claims, 8 Drawing Sheets

REPAIR OF FILTRATION ELEMENTS FOR POLYMER MANUFACTURE

FIELD OF THE INVENTION

The present invention relates to the manufacture of polymers, and in particular relates to filtration of polymer resin near the end of the manufacturing process, and most specifically relates to repair of the filtration elements used for such filtering during the manufacture of polyester.

BACKGROUND OF THE INVENTION

Polyester is the name usually given to those synthetic polymers which are the condensation products of dicarboxylic acids and dihydroxy alcohols, particularly either dimethyl terephthalate or terephthalic acid condensed with ethylene glycol. Polyester has obtained widespread use in magnetic tapes, bottles, nonwoven textiles, films, and fibers.

In commercial polyester manufacturing processes, for example those for manufacture of polyester chip, fiber, film, or packaging, one of the last steps in the process is to filter polyester in the molten or liquid state through a series of fine filters to remove the various impurities or other solid particulates which would detract from the appearance and performance of extruded polyester.

In one type of mechanical filtration system, the liquid polyester is directed through long tubular filters arranged in bundles. Each of the filters in turn is formed of a number of fine metal fibers arranged in random fashion, somewhat analogous to a nonwoven textile. These fibers are in turn held in place in the tubular filter elements by a fine mesh screen. The filtration and cleaning conditions under which these elements operate tend to be rather harsh. In particular, such filter elements are exposed to temperatures on the order of about 300° C. and pressures of up to 1000 pounds per square inch (psi) for prolonged periods of time. They are also exposed to the polyester itself, and to related materials including unreacted precursors such as glycols, esters and acids.

As might be expected, such filter elements can eventually become clogged and need to be either cleaned or replaced, with cleaning typically preferred because of the relatively high cost of each element. One preferred cleaning process comprises boiling the elements in an appropriate solvent such as triethylene glycol until satisfactory conditions are reestablished.

Other commonly produced polymers are also filtered with the same type of filter elements. These include thermoplastic polymers such as polyethylene, polypropylene and polystyrene. The chemical nature of these polymers is such that the preferred method of cleaning the filter elements is a high temperature "burn-out" process in which the residual polymer is thermally degraded and then the element is washed appropriately. For example, a typical process would involve heating the elements to a temperature of between about 300°-450° C. for a period of four or five hours. The specific temperature would depend upon the particular polymer being cleaned from the element. Polyethylene and polypropylene will degrade at the lower temperatures in this range, while polystyrene will only degrade when the higher temperatures are reached.

Because of the relatively harsh filtration and cleaning conditions to which the filter elements are exposed, they often develop flaws, particularly when the fine mesh screen breaks at a particular point thereby producing a hole. One such small hole can eliminate an entire filter element from further use. As mentioned earlier, the filter elements are relatively expensive making repair desirable. A number of repair techniques have accordingly been attempted to date, but generally without success. One technique includes the use of fused powdered metals to repair the filter elements, but the method raises two problems First, the patches tend to crack under use and cleaning. Second, the high temperatures required to fuse the metal can adversely affect the filter media, which are often formed from stainless steel.

Accordingly, to date there exists no satisfactory technique for repairing these filter elements and consequently they must generally be replaced at significant costs, even where the flaws in them are relatively small and straightforwardly detectable.

OBJECT AND SUMMARY OF THE INVENTION

Therefore, it is object of the present invention to provide a method of repairing filter elements in a manner that will withstand the conditions of both filtration and cleaning. The invention meets this object by providing a repair method for filter elements such as those used to filter polyester during the later stages of polymer manufacture in which the filter media comprises a particulate solid media arranged in a desired shape and maintained in that shape by a surrounding porous container that has filtration openings of a desired size. The method comprises filling undesirably large openings in the surrounding porous container that result from damage to the container and through which enlarged openings particulate contaminants would otherwise escape filtration. The polymeric resin further comprises a resin with a glass transition temperature when cured that is at least greater than the melting point of polyester, and that has an absence of any chemical functional groups at temperatures at least as great as the melting point of polyester that would substantially react with polyester, the glycol precursors of polyester, the acid precursors of polyester, or the solvents useful in cleaning polyester from such filter elements In another embodiment, the invention comprises incorporation of a resin system with a thermal degradation temperature when cured that is at least greater than the temperature at which thermoplastic polymers will thermally degrade.

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments, and wherein:

DETAILED DESCRIPTION OF THE PREFERRED EMBODIMENT

Figure 1:
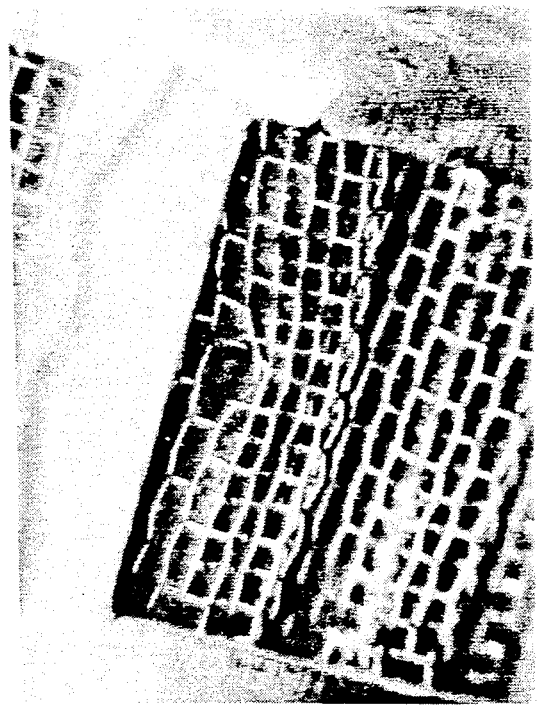
FIG. 1 is a photograph of a filter element with an undesirably enlarged opening in the mesh metal screen.

The present invention is a method for repairing filtration elements used to filter polyester during the final stage of polymer manufacture, of which fiber is a typical product, in which the filtration elements comprise tubular filters arranged in bundles. Each tubular filter is formed of a number of fine metal fibers arranged in random fashion and held in place by a fine metal mesh screen. It will be understood, however, that the invention applies to any particulate solid media arranged in a desired shape and maintained in that shape by a surrounding porous container that has filtration openings of a desired size.

In the most typical embodiments, the desired shape of the filtration element is an elongate cylinder, the particulate solid material is a plurality of fine metal fibers, and the porous container comprises a fine mesh screen supported by a generally cylindrical framework. In the photographs of FIGS. 1 through 8, the largest solid portions observable are the respective cylindrical frameworks with large openings therein, the fine mesh screens are visible within the framework, and the fine metal fibers are visible as held in place by the mesh screens.

The method of the invention comprises filling undesirable large openings in the surrounding porous container—usually openings in the fine mesh screen—that result from damage to the container and through which enlarged openings particulate contaminants would otherwise escape filtration. These enlarged openings are filled with a polymeric resin which comprises a thermosetting resin with a glass transition temperature when cured that is at least greater than the melting point of polyester. The thermosetting resin further has an absence of any chemical functional groups that at temperatures at least as great as the melting point of polyester would substantially react with polyester, the glycol precursors of polyester, the acid precursors of polyester, or the solvents used to clean polyester from such filter elements. Preferably, the thermosetting resin used should have a glass transition temperature that is greater than 300° C.

In an alternative embodiment, where the filter elements are used in conjunction with the manufacture of one or more of the polyolefin thermoplastic polymers described earlier, the thermosetting resin has a thermal degradation temperature that is at least greater than as the temperatures at which thermal degradation of the polyolefins will take place so that during the burn out cleaning process, the resin and the repair will remain intact. For most polyolefins, such a thermal degradation temperature should be between about 300°–450° C. as set forth earlier herein.

As an additional step in preferred embodiments of the invention the method further comprises filling the enlarged openings with a fine particulate solid that improves the compressive strength and heat distortion temperature of the resulting filled structure. In the most preferred embodiments, this step comprises adding about 30 percent by weight of fine particulate aluminum oxide to the resin system. The fine particulate solid preferably has a particle size large enough to avoid absorption of too much of the resin system into the particles, yet small enough to provide an appropriate distribution of reinforcement. Particle sizes of between about 1 and 100 microns have accordingly been found preferable.

The preferred resin system is a thermosetting bismaleimide for which the most preferred embodiment is a cross linked copolymer of 4,4'-(1-methylethylidene)-bis(2-(2propenyl)phenol) (also referred to more commonly as 4,4'-bismaleimidodiphenylmethane) and 1,1'-(methylenedi-4,1-phenylene)bis (1H-pyrrole-2,5-dione) (referred to more commonly as 0,0'-diallylbisphenol A). One source of this preferred resin system is the Matrimid ™ 5292 System from Ciba-Geigy, Resins Department, Three Skyline Drive, Hawthorne, N.Y. 10532. It will be understood, however, that any thermosetting resin system meeting the criteria set forth herein will be suitable and that the Matrimid ™ 5292 System represents one presently available commercial embodiment.

As an additional preferred characteristic, the polymer resin should be resistant to hydrolysis and glycolysis at temperatures at least as great as the melting point of polyester. Furthermore, the thermosetting resin should have superior physical properties at such temperatures, including maintaining an appropriate tensile strength and modulus at those temperatures.

Figure 9:
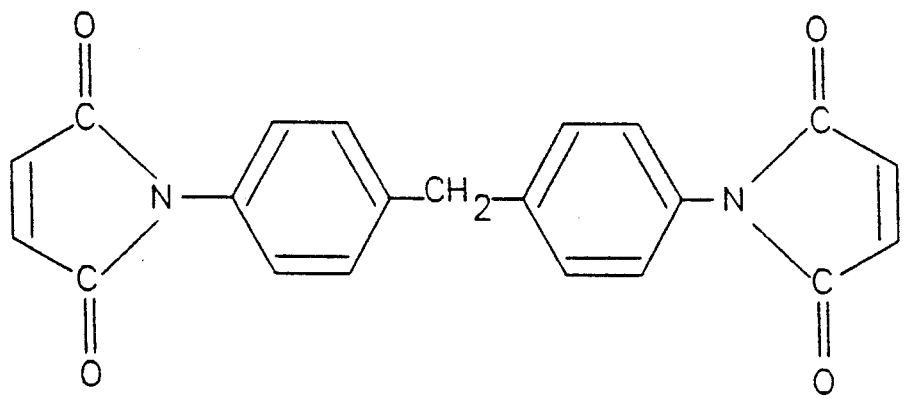
FIGS. 9 and 10 are structural formulations of the preferred thermosetting resin system of the present invention.
Figure 10:
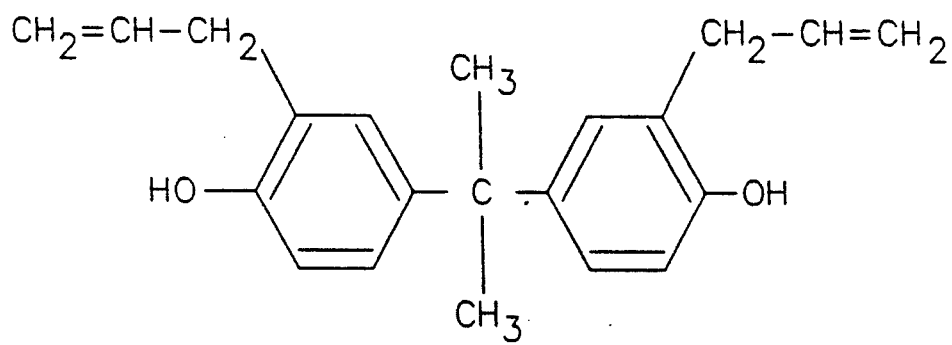

The preferred resin system is set forth in FIGS. 9 and 10 in which FIG. 9 sets forth the 4,4'-bismaleimidodiphenylmethane and FIG. 10 represents 0,0'-diallylbisphenol A.

Figure 11:
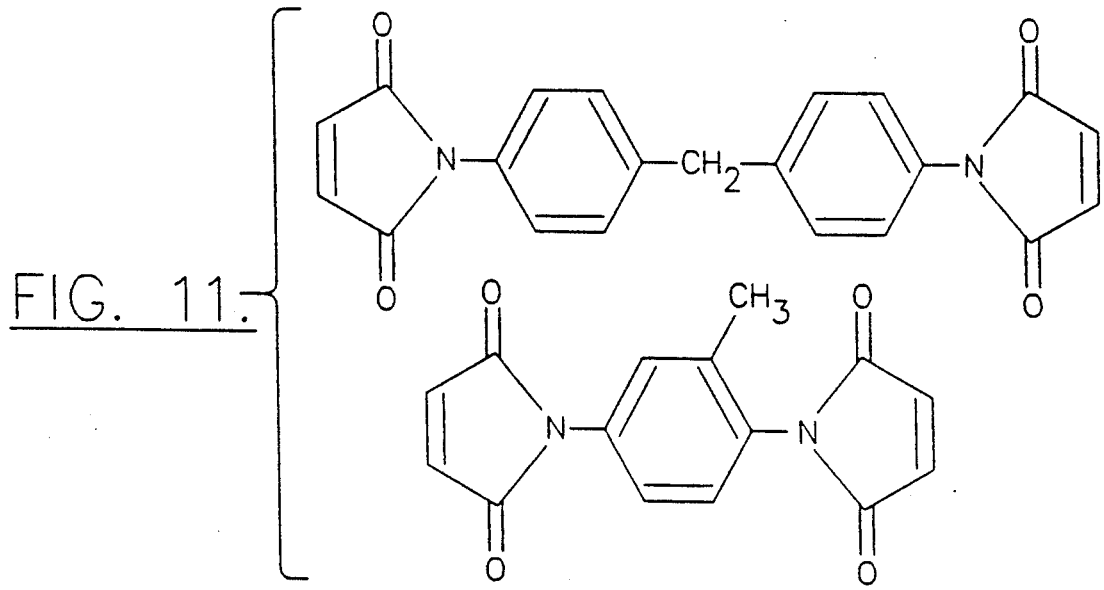
FIG. 11 is a structural formula of a first alternative polyimide resin system according to the present invention.
Figure 13:
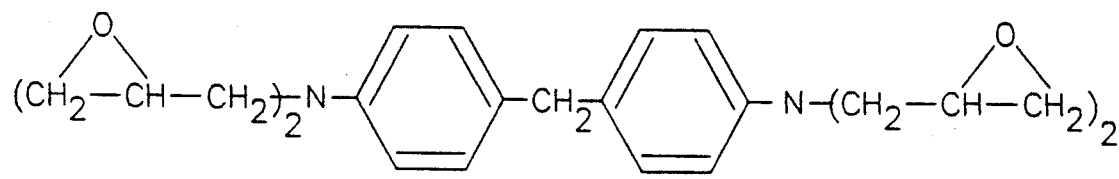
FIG. 13 is a structural formula of a first component of an epoxy resin system according to the present invention.
Figure 14:
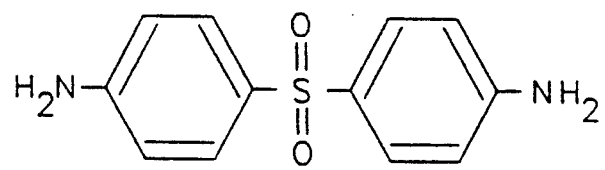
FIG. 14 is a structural formula of the second component that along with the component illustrated in FIG. 13 forms an epoxy resin system according to the present invention.
Figure 12:
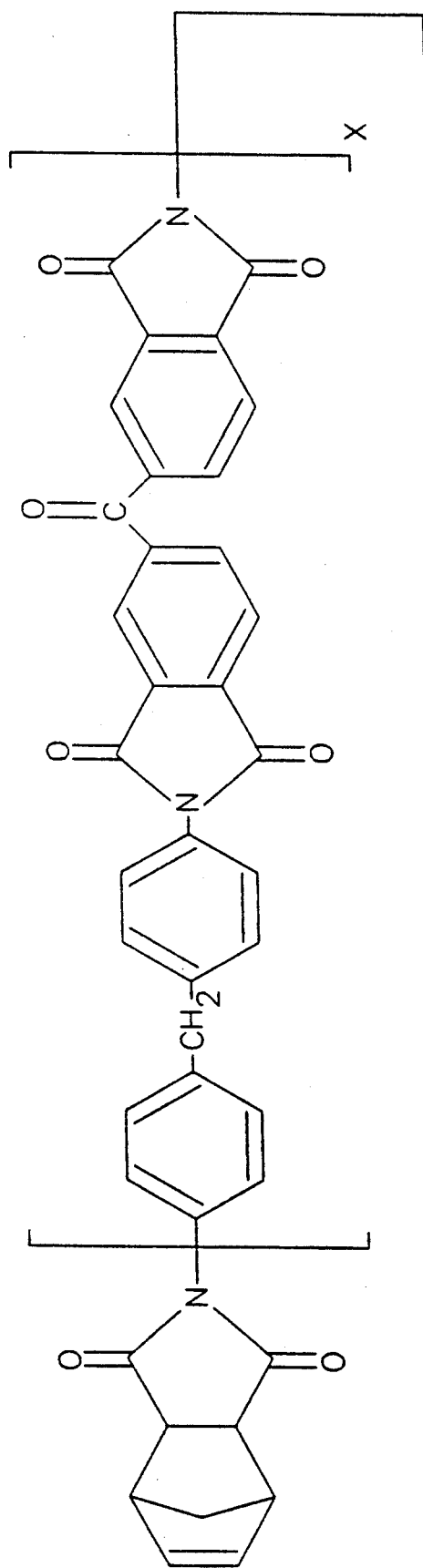
FIG. 12 is a structural formula of a second alternative polyimide resin system according to the present invention.
Figure 12:
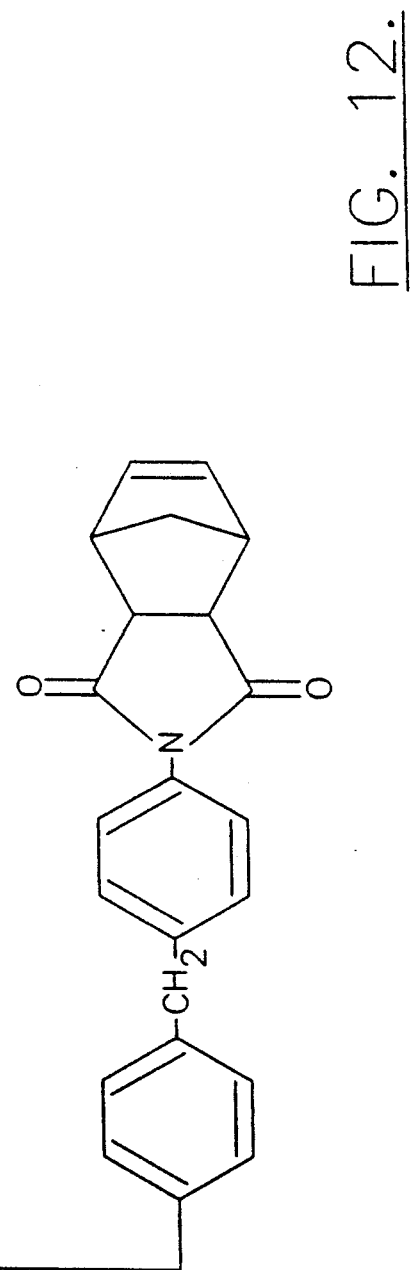

In another embodiment, the resin system comprises the Kerimide 601 polyimide resin system illustrated in FIG. 11 and available from Rhone-Poulenc, Inc. CN5266, Princeton, N.J. 08543. Another appropriate resin system is the PMR-15 polyimide resin system illustrated in FIG. 12 and available from American Cyanamid Co., Chemicals Group, One Cyanamid Plaza, Wayne, New Jersey 07470.

In other embodiments, the resin system can comprise a high temperature resistant epoxy system. One example of such a resin system is tetraglycidyl 4,4-diaminodiphenyl methane, which is also available from Ciba-Geigy, and the commonly available diamino diphenylsulfone, also referred to as DDS. The cured resin from these two components has a glass transition temperature of 209° C., however, so it is most preferably used with lower melt or degradation temperature polymers.

As illustrated in the photographs, in another aspect the invention comprises a repaired filter element of the type used to filter polyester during the later stages of polymer manufacture. The filter element comprises those structural features set out earlier and is repaired using the preferred resin systems just described. As also previously described, the typical filter element used in such polyester filtration is an elongate cylinder with a plurality of fine metal fibers carried therein in a porous container that comprises a fine mesh screen, all supported by a generally cylindrical framework. In typical embodiments, the fine mesh screen can comprise either a 165 by 800 support mesh having openings therein of approximately 40 microns each, and in another typical embodiment comprises a 50 by 250 support mesh having openings therein of approximately 100 microns each.

In another aspect, the invention comprises the filtration apparatus for filtering polyester or other polymers during the later stages of polymer manufacture in which the apparatus comprises a bundle of filter elements through which polyester to be filtered is directed. As set forth previously, each filter element comprises the particulate medium, the surrounding porous container, and at least one repaired breach in the surrounding porous container.

Figure 15:
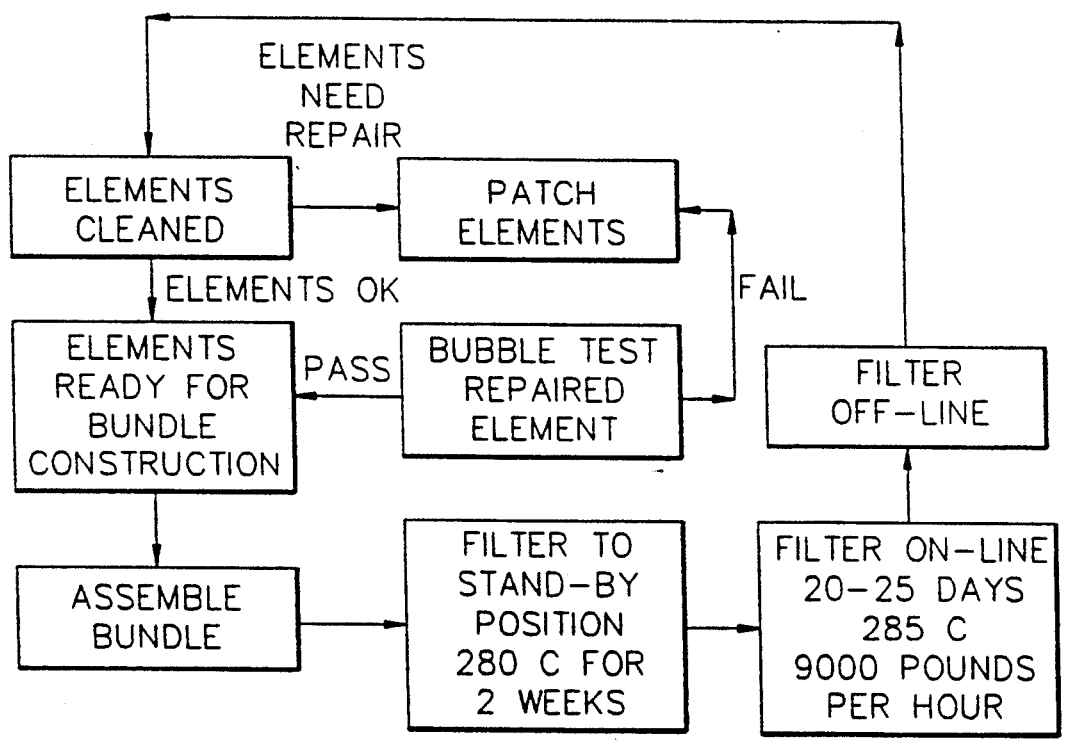
FIG. 15 is a filter cycle flow sheet illustrating the filtration and repair cycle according to the present invention.

In yet another aspect, the invention comprises a method of filtering polyester (or another polymer) which is illustrated in the flow chart of FIG. 15. As illustrated therein, and beginning in the lower left hand portion of the flow chart, filter elements are assembled into a bundle and then moved to a standby position where they are maintained at about 280° C. for approximately two weeks. The filter elements then go on line for between about 20 and 25 days of filtration at about 285° C. and at a flow rate of about 9,000 pounds per hour of polyester. The filters are then taken off line, cleaned, and tested. Elements not needing repair are returned directly for bundle construction, while those needing repair are patched. The repaired elements are again tested and passed to bundle construction if appropriate, or recycled through the patching phase if further repair is required. A group of elements is then reassembled into a bundle beginning the entire cycle again.

Therefore, as seen in FIG. 15 in this aspect the method comprises filtering polyester (or another polymer) through a filtration bundle formed of a plurality of filter elements in which each filter element comprises the particulate solid medium arranged in the desired shape and maintained in that shape by the surrounding porous container that has filtration openings of a desired size. The filter elements are cleaned following filtration and elements needing repair are separated from those that are intact. Undesirably enlarged openings in the surrounding porous container in the elements needing repair are filled with the thermosetting polymeric resin according to the invention which has the glass transition temperature and chemical properties already recited herein. The cleaned elements are assembled into filtration bundles, after which the steps of the method are repeated.

As just set forth, this filtration method can further comprise the step of testing the cleaned filter elements to identify any undesirable enlarged openings in any particular elements prior to the step of separating the elements needing repair from the intact elements.

The method can further comprise the step of testing repaired elements and separating successfully repaired elements from those needing further repair and repeating the repair step for those elements for which it is necessary, all prior to the step of assembling cleaned elements and cleaned and repaired elements into filtration bundles.

Additionally, the method can comprise the step of maintaining the filtration bundles in the standby position at an elevated temperature for about 280° C. for about two weeks following the step of assembling the cleaned elements into bundles and prior to the steps of repeating the filtration scheme. The general purpose of the standby phase is to keep elements available for immediate use should those on line fail unexpectedly.

The preferred testing method is a bubble test used to measure the largest holes or pores in filter elements. The measured gas pressure required to form the first bubble is a relative measure of the hole or pore in the filter element. In the test, filter elements are first inspected to assure that they are both clean and dry. The element is then submerged in a bath of isopropyl alcohol and a supply of gas is attached to the end of the filter element through which polyester would normally flow in use. The gas pressure is gradually increased until a predetermined pressure reading is reached on a manometer. If such pressure is reached without any bubbles having been generated, the element is considered good. If, however, bubbles are observed prior to the desired reading on the manometer, the element is considered bad, and is submitted for further repair.

In one embodiment of the repair step, the two components of the bismaleimide system are combined and warmed to 110° C. to form a low viscosity liquid. In preferred embodiments, a fine particulate aluminum oxide is added in an amount of about 30 percent by weight. This material improves the compressive strength of the resin that fills the void where the filter media is absent, and also increases the heat distortion temperature of the cured mixture. After thorough mixing, the resin is applied to a filter element that has been heated to about 100° C. in order to facilitate penetration of the resin into the surrounding filter media. The element is then placed in a forced air oven, or other appropriate heating system, at about 200° C. for a period of about two hours. Although the two hour time period of 200° C. is not a complete cure cycle, a review of the heat-up profile for stand-by filter elements according to the present invention indicates that this time and temperature profile provides a suitable final cure cycle.

The repaired elements have also been subjected to burn out testing. In one test, two of the repaired filter elements were kept in an oven at 850° F. (approximately 450° C.) for a period of between four and five hours. These elements and their repairs were considered satisfactory, and one portion of missing repair media was the result of a poorly performed initial repair—the working temperatures of the element and the resin system wee too high—rather than to any problem with the resin system.

As alluded to earlier, the repair method offers a completely acceptable element for approximately one percent of the price of a new element and therefore offers a tremendous advantage in efficiency and related savings.

These successes are illustrated by the various photos included as the drawings. FIG. 1 illustrates a filter element in which a portion of the fine mesh screen has been breached through the harsh conditions of use or cleaning.

Figure 2:
FIGS. 2, 3 and 4 are photographs of newly repaired filter elements.
Figure 3:
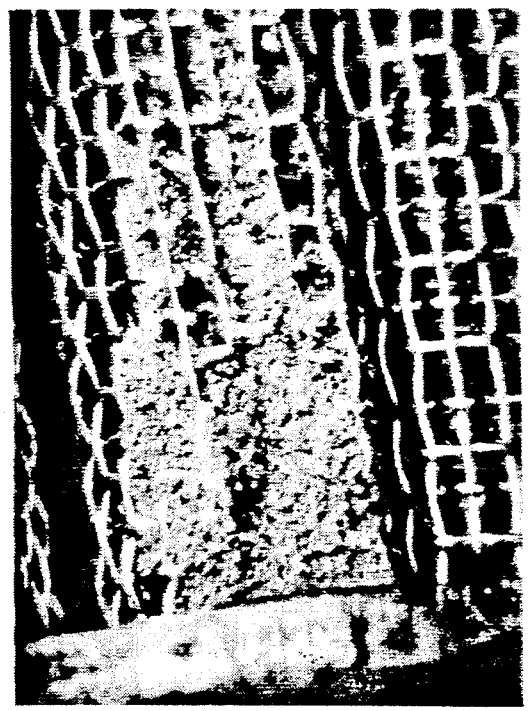
Figure 4:
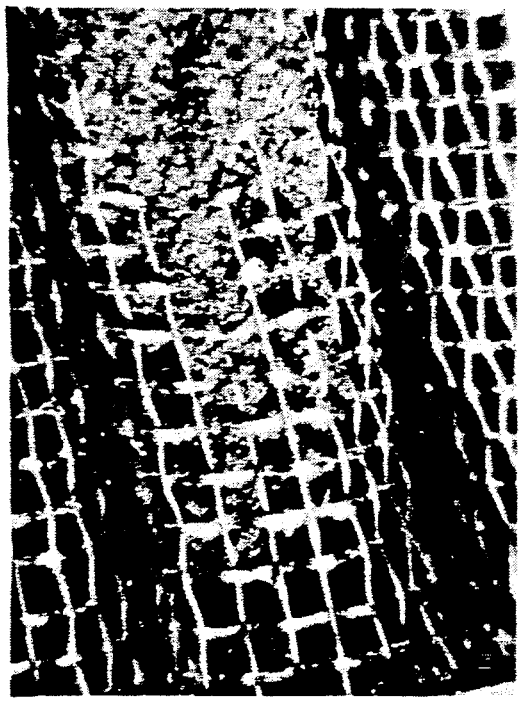
Figure 5:
FIG. 5 is a photograph of a filter element after one complete filtration and cleaning cycle.
Figure 6:
FIG. 6 is a photograph of the filter element of FIG. 5 after two complete filter cycles.
Figure 7:
FIG. 7 is a photograph of another repaired filter element after one filter cycle.
Figure 8:
FIG. 8 is a photograph of the filter element of FIG. 7 after two filter cycles.

FIGS. 2, 3 and 4 illustrate repaired breaches in which the bismaleimide resin and the fine aluminum oxide particles have been mixed to form an appropriate repair.

Although it will be seen from FIGS. 2, 3 and 4 that the repair appears to form a solid portion in what was originally a mesh, it has been found according to the present invention that this characteristic is entirely appropriate when the element is again placed in use. The photographs herein are magnified approximately thirteen times, and therefore these repaired portions represent very small areas. A typical filtration element is about three or four feet long and approximately one inch in diameter.

FIGS. 5, 6, 7 and 8 illustrate repaired breaches after either one or two of the filter use, test, repair, and reuse cycles illustrated in FIG. 15. These photographs demonstrate the long term success of the method of the present invention in repairing such breaches, particularly in that the repairs withstand the harsh conditions of standby, filtration, and cleaning.

In the drawings and specification, there have been disclosed typical preferred embodiments of the invention and, although specific terms have been employed, they have been used in a generic and descriptive sense only and not for purposes of limitation, the scope of the invention being set forth in the following claims.

That which is claimed is:

1. A method of repairing filter elements used to filter polyester in a liquid state during polyester manufacture in which the filter element comprises a particulate solid media arranged in a desired shape and maintained in that shape by a surrounding porous container that has filtration openings of a desired size, the method comprising:

filling undesirably enlarged openings in the surrounding porous container that result from damage to the container, and through which enlarged openings particulate contaminants escape filtration, with a polymeric resin which polymeric resin is then cured in the enlarged openings to repair the filter element, and wherein the polymeric resin comprises, a thermosetting resin with a glass transition temperature when cured that is at least greater than a melting point of polyester, and wherein the polymeric resin has an absence of any chemical functional groups that at temperatures at least as great as the melting point of polyester substantially react with polyester, glycol precursors of polyester, acid precursors of polyesters, or solvents useful in cleaning polyester from the filter elements.

2. A method according to claim 1 wherein the step of filling enlarged openings in the surrounding porous container comprises filling enlarged openings in a metal mesh screen.

3. A method according to claim 1 wherein the step of filling enlarged openings in the surrounding porous container with the polymeric resin further comprises filling the enlarged openings with a thermosetting resin that has a glass transition temperature greater than 300° C.

4. A method according to claim 1 wherein the step of filling enlarged openings in the surrounding porous container with the polymeric resin further comprises filling the enlarged openings with a fine particulate solid to improve compressive strength and heat distortion temperature of the repaired filter element.

5. A method according to claim 1 wherein the step of filling enlarged openings in the surrounding porous container with the polymeric resin further comprises filling the enlarged openings with a thermosetting bismaleimide system.

6. A method according to claim 5 wherein the step of filling enlarged openings with the thermosetting bismaleimide system comprises filling the enlarged openings with a crosslinked copolymer of 4,4'-(1-methylethylidene)bis(2-(2-propenyl)phenol) and 1,1'-(methylenedi-4,1-phenylene)bis(1H-pyrrole-2,5dione).

7. A method according to claim 5 wherein the step of filling enlarged openings with the thermosetting bismaleimide system comprises filling the enlarged openings with 1,1'-(2-methyl-1, 4-phenylene)bis(1H-pyrrole-2,5-dione) and 1,1'-(methylenedi-4,1-phenylene)bis(1H-pyrrole-2,5-dione).

8. A method according to claim 1 wherein the step of filling enlarged openings in the surrounding porous container with the polymeric resin further comprises filling the enlarged openings with a thermosetting resin that is resistant to hydrolysis and glycolysis at temperatures at least as great as the melting point of polyester.

9. A method for repairing filtration elements used to filter polyester during a final stage of polyester manufacture in which the filtration elements comprise tubular filters arranged in bundles and wherein each tubular filter is formed of a number of fine metal fibers arranged in random fashion and held in place by a fine mesh screen, the method comprising:

repairing undesired openings in the fine mesh screen resulting from damage to the filtration element during use thereof by filling the openings with a thermosetting cross-linking resin having a glass transition temperature when cured that is higher than at least a melting point of polyester, and that does not include chemical linkages that chemically react with polyester, ethylene glycol, terephthalic acid, or solvents in which polyester is substantially soluble, and then curing the thermosetting crosslinking resin filling the openings in the fine mesh screen, to thus repair the filtration element.

10. A repair method according to claim 9 further comprising the step of adding a particulate solid material to the resin.

11. A repair method according to claim 10 wherein the step of adding a particulate solid material to the resin comprises adding about thirty percent by weight of fine particulate aluminum oxide to improve compressive strength and heat distortion temperature of the resin.

12. A repair method according to claim 9 wherein the step of filling the openings with the thermosetting crosslinking resin comprises filling the openings with a thermosetting bismaleimide system.

13. A repair method according to claim 9 wherein said thermosetting bismaleimide system comprises a crosslinked copolymer of 4,4'-(1-methylethylidene)-bis(2-(2-propenyl)phenol) and 1,1'-(methylenedi-4,1-phenylene)bis(1H-pyrrole-2,5-dione).

14. A method of repairing filter elements used to filter polymers in a liquid state in which the filter element comprises a particulate solid media arranged in a desired shape and maintained in that shape by a surrounding porous container that has filtration openings of a desired size, the method comprising:

filling undesirably enlarged openings in the surrounding porous container that result from damage to the container and through which enlarged openings particulate contaminants escape filtration, with a polymeric resin, which polymeric resin is then cured in the enlarged openings to repair the filter element, and wherein the polymeric resin comprises, a thermosetting resin with a thermal degradation temperature when cured that is at least greater than a temperature at which thermal degradation of the polymer takes place, and wherein the polymeric resin has an absence of any chemical functional groups that at temperatures at least as great as the temperature at which thermal degradation of the polymer takes place substantially react with the polymer, precursors of the polymer, or solvents useful in cleaning the polymer from the filter elements.

15. A method according to claim 14 wherein the step of filling undesirably enlarged openings with the polymeric resin further comprises filling the openings with a polymeric resin that has a thermal degradation temperature of between about 300°–450° C.

16. A method according to claim 14 wherein the step of filling enlarged openings in the surrounding porous container with the thermosetting resin comprises filling the enlarged openings with a resin system of tetraglycidyl 4,4-diaminodiphenyl methane and diamino diphenylsulfone.

* * * * *

UNITED STATES PATENT AND TRADEMARK OFFICE
CERTIFICATE OF CORRECTION

PATENT NO. : 5,217,659

DATED : June 8, 1993

INVENTOR(S) : Nichols, et al.

It is certified that error appears in the above-identified patent and that said Letters Patent is hereby corrected as shown below:

ON THE TITLE PAGE; ITEM [56]:
UNDER "REFERENCES CITED":

"Plastice" should be -- Plastics --

In Column 2, line 21, after "is" insert -- an --

In Column 4, line 2, delete the word "as"

In Column 4, line 26, after "2" (second occurrence) insert a dash

In Column 6, line 53, "wee" should be -- were --

In Column 7, line 47, "polyesters" should be -- polyester --

UNITED STATES PATENT AND TRADEMARK OFFICE
CERTIFICATE OF CORRECTION

PATENT NO. : 5,217,659

DATED : June 8, 1993

INVENTOR(S) : Nichols, et al

It is certified that error appears in the above-indentified patent and that said Letters Patent is hereby corrected as shown below:

In Column 8, line 8, after "5" insert a dash

Signed and Sealed this

Twenty-ninth Day of March, 1994

Attest:

BRUCE LEHMAN

Attesting Officer

Commissioner of Patents and Trademarks